United States Patent [19]

Chupeau et al.

[11] Patent Number: 5,278,915
[45] Date of Patent: Jan. 11, 1994

[54] METHOD FOR HIERARCHICAL ESTIMATION OF THE MOVEMENT IN A SEQUENCE OF IMAGES

[75] Inventors: Bertrand Chupeau, Rennes; Michel Pecot, Thorigne-Fouillard, both of France

[73] Assignee: Thomson-CSF, Puteaux, France

[21] Appl. No.: 828,993

[22] PCT Filed: May 24, 1991

[86] PCT No.: PCT/FR91/00416
§ 371 Date: Feb. 4, 1992
§ 102(e) Date: Feb. 4, 1992

[87] PCT Pub. No.: WO91/19264
PCT Pub. Date: Dec. 12, 1991

[30] Foreign Application Priority Data

Jun. 6, 1990 [FR] France .................... 90 07022

[51] Int. Cl.⁵ ............................ G06K 9/00
[52] U.S. Cl. ...................... 382/1; 358/105; 382/49; 382/56
[58] Field of Search ........... 382/1, 56, 49; 358/105, 358/166

[56] References Cited

U.S. PATENT DOCUMENTS

| | | | |
|---|---|---|---|
| 4,809,347 | 2/1989 | Nash et al. | 382/49 |
| 5,027,201 | 6/1991 | Bernard | 358/105 |
| 5,050,230 | 9/1991 | Jones et al. | 358/166 |

OTHER PUBLICATIONS

Proceedings of the Conference on Computer Vision and Pattern Recognition Jun., 1983, Washington, pp. 246-252; P. J. Burt et al.: "Multi-resolution flow—through motion analysis".

Proceedings of the Conference on Computer Vision and Pattern Recognition Jun., 1986, Miami Beach pp. 219-226; L. R. Williams et al: "A coarse-to-fine control strategy for stereo and motion on a mesh-connected computer".

Proceedings of the Conference on Computer Vision and Pattern Recognition, Jun., 1983, Washington, pp. 432-441; F. Glazer: "Scene matching by hierarchical correlation".

Proceedings of the Eusipco-88, Fourth European Signal Processing Conference Sep., 1988, Grenoble pp. 246-250; J. A. M. Stuifbergen et al.: "Hierarchical estimation of spatio-temporal intensity changes in images".

*Primary Examiner*—Leo H. Boudreau
*Attorney, Agent, or Firm*—Oblon, Spivak, McClelland, Maier & Neustadt

[57] ABSTRACT

The method consists in effecting a hierarchical decomposition of the image by levels of resolutions, ($I_{31}$, $I_{32}$, $I_{33}$; $I_{21}$, $I_{22}$, $I_{23}$; $I_{11}$, $I_{12}$, $I_{13}$; I), in estimating an overall movement at the coarsest level of resolution and in refining the estimate ($I_{31}$, $I_{32}$, $I_{33}$) in each level as the resolution increases.

9 Claims, 6 Drawing Sheets résolution
1/4
1/2
1

(J = 2)

METHOD FOR HIERARCHICAL ESTIMATION OF THE MOVEMENT IN A SEQUENCE OF IMAGES

The present invention relates to a method for hierarchical estimation of the movement in a sequence of images based on the decomposition of the spectrum of the images into sub-bands.

The conventional algorithms for estimation of movement working directly on the images and based on techniques of correlation or of gradient do not give satisfactory results in the case of large movements and in the uniform areas of the images. Moreover, the movement of the fine details of the images is generally very badly rendered.

The aim of the invention is to remedy the abovementioned drawbacks.

To this end, the subject of the invention is a method for hierarchical estimation of the movement in a sequence of images, characterized in that it consists in effecting a hierarchical decomposition of the image by levels of resolutions, in estimating an overall movement at the coarsest level of resolution and in refining the estimate in each level as the resolution increases.

The invention has the principal advantage that it permits calculation of a displacement field of vectors between two successive images of a sequence. This field can be defined for each pixel of the image, with a precision of displacement less than 1 pixel. Moreover, with the addition of two pyramids of high-frequency images with growing resolutions it permits the movement of fine details of the image to be restored, which would disappear in a simple single-pyramid low frequency estimate.

The method according to the invention also has the advantage of being able to be used in all the image processing devices which necessitate a field of movement close to the real field such as the devices for coding by compensation for movement, in the context, for example, of the applications for high-definition television, or also the devices for 50HZ/60HZ standard conversion, for de-interlacing of frames or for 50HZ/100HZ conversion.

Other characteristics and advantages of the invention will appear below with the aid of the description which follows given with reference to the attached drawings wherein FIG. 1 is a multi-resolution pyramid;

According to the invention the analysis of the movement in a sequence of images takes place in a hierarchical fashion. It consists in first of all estimating an overall movement at a coarse level of resolution of the image, then in refining this estimate as the resolution of the images processed increases.

Figure 1:
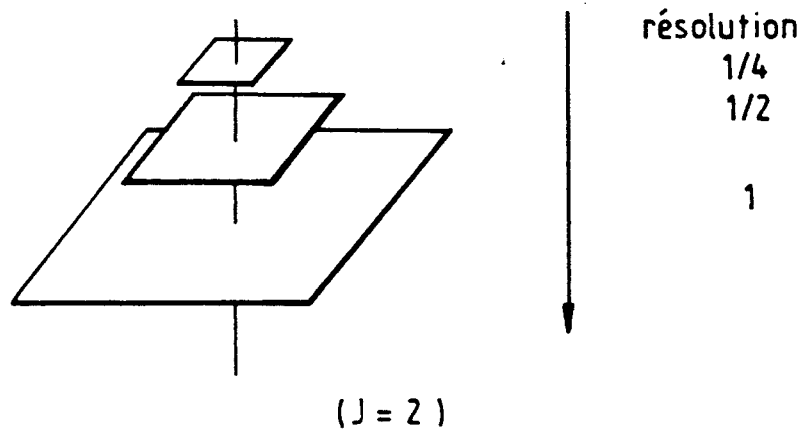

FIG. 1 describes a multi-resolution pyramid of images, composed of an assembly of images of resolution $2^{-j}$ where j belongs in the interval [o,j], the fullresolution image corresponding to j=o. Thus, the estimate made at a level of resolution $2^{-j}$ serves for initialization of the estimate made at the higher level of resolution $2^{-(j-1)}$. The invention uses 3 such multi-resolution pyramids, one pyramid of low-frequencies images and 2 pyramids of high-frequencies images. These three pyramids are naturally obtained by using a hierarchical decomposition of the images into sub-bands.

Figure 2:
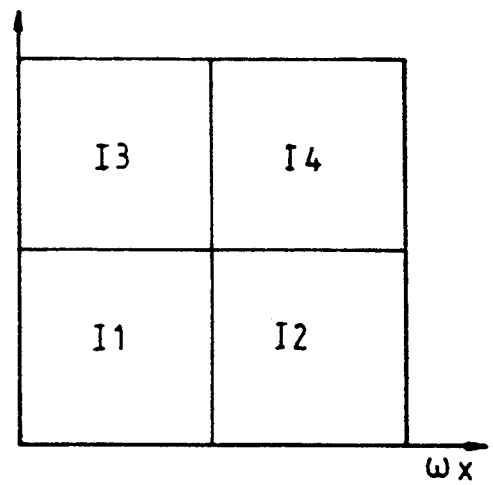
FIG. 2 is a decomposition of an image into sub-bands.

A mode of division of the spectrum of an image is represented in FIG. 2, according to four frequency bands $I_1$, $I_2$, $I_3$ and $I_4$, represented in a right-angled two-dimensional reference system, incorporating two axes $\omega_x$ and $\omega_y$ on which are carried respectively the spatial frequencies $\omega_x$ and $\omega_y$, measured respectively in cycles by width of image and height of image.

The band $I_1$ corresponds to the domain of the low frequencies and the other three bands $I_2$, $I_3$ and $I_4$, correspond to that of the high frequencies. Such a division can, for example, be obtained by means of a division module organized in the manner represented in FIG. 3. This module incorporates a first set of single-dimensional high-pass ($H_1$) filters referenced ($1_1$, $1_2$ and $1_3$) coupled to decimator by two circuits ($2_1$, $2_2$ and $2_3$) and a second set of single-dimensional low-pass ($H_0$) filters ($3_1$, $3_2$ and $3_3$) coupled to decimator by two circuits ($4_1$, $4_2$ and $4_3$). The filters $1_1$ and $3_2$ respectively perform a first filtering along the columns of the image I applied to their inputs.

Filters $1_2$ and $3_1$ perform a filtering along the lines of the image on the points which have already been filtered and decimated by two by the high-pass filter $1_1$ and the decimator $2_1$. The filters $1_3$ and $3_3$ perform a filtering along the lines of the image on the points which have already been filtered and decimated by two by the low-pass filter $3_2$ and the decimator $4_1$. The outputs of the filters $3_3$, $1_3$, $3_1$ and $1_2$ are in their turn decimated by two in order to respectively form the decomposition of the initial image I into the four subbands $I_1$, $I_2$, $I_3$ and $I_4$ of FIG. 2.

Figure 4:
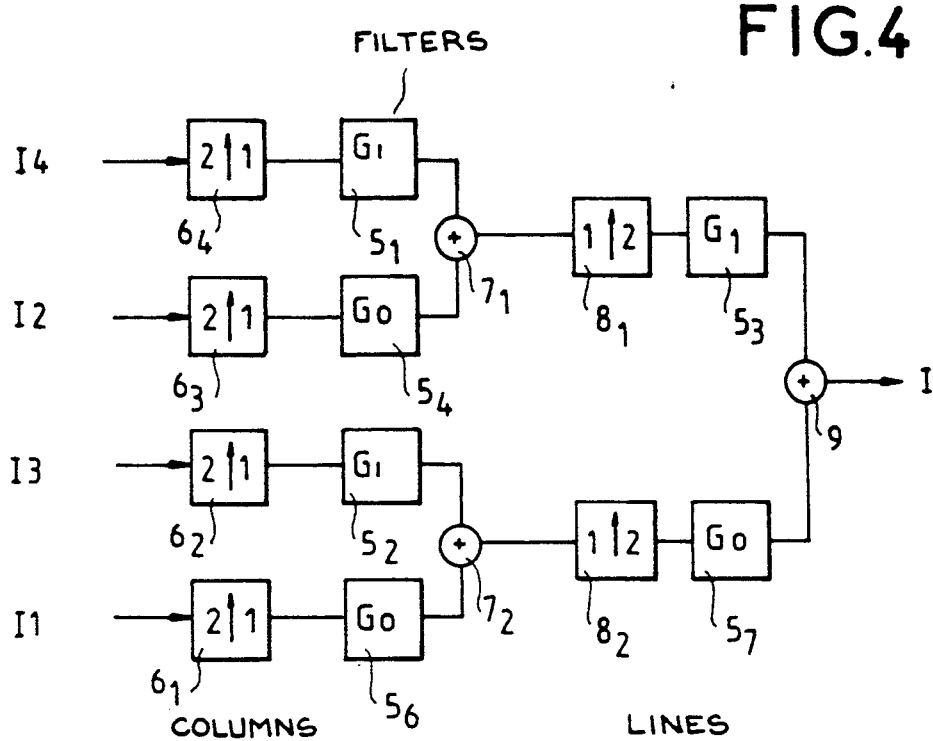
FIG. 4 is a mode of embodiment of an elementary module for reconstitution of an image from its sub-bands.

The reconstruction of the image I from the partial images $I_1$, $I_2$, $I_3$ and $I_4$ can be obtained in the manner represented in FIG. 4 by means of ($G_1$) filters $5_1$ to $5_3$ and ($G_0$) filters $5_4$, $5_6$ and $5_7$ with a transfer function defined in the complex plane of the complex variable Z by the relations:

$$G_0(Z) = 2 H_1(-Z)/D(Z) \tag{1}$$

$$G_1(Z) = -2 H_0(-Z)/D(Z) \text{ where} \tag{2}$$

-continued $$D(Z) = H(Z) \cdot H_1(-Z) - H_0(-Z) \cdot H_1(Z).  \quad (3)$$

In FIG. 4 the elements of the image obtained in the sub-bands $I_1$, $I_2$, $I_3$ and $I_4$ are applied respectively to the inputs of the filters $5_6$, $5_2$, $5_4$ and $5_1$ through 2-times oversamplers referenced respectively $6_1$, $6_4$.

The outputs of the filters $5_1$, $5_4$ on the one hand and $5_2$, $5_6$ on the other hand, are coupled respectively to the adding circuits $7_1$, $7_2$. The outputs of the adding circuits $7_1$, $7_2$ are coupled respectively to the filters $5_5$, $5_7$ respectively through oversamplers $8_1$, $8_2$. The resulting image I is obtained at the output of an adding circuit (9) coupled respectively to the outputs of the filters $5_5$, $5_7$.

The $G_0$ and $G_1$ filters described by the formulae (1) and (2) permit a perfect reconstruction of the original image whatever the filters $H_0$ and $H_1$ are. Nevertheless, it is preferable, for reasons of numerical stability in finite arithmetic, to use filters with a finite impulse response FIR. Moreover, the filters with a finite impulse response FIR can be constructed with a linear phase which is better adapted to the processing of images, in particular when the filtered images corresponding to the intermediate resolutions are of interest. In these conditions the reconstruction filters must have transfer functions defined as follows:

$$G_0(Z) = 2 H_1(-Z) \text{ and}  \quad (4)$$

$$G_1(Z) = -2 H_0(-Z)  \quad (5)$$

the relations (4) and (5) have the advantage of removing the inter-band folding.

The condition for perfect reconstruction of the original image is then written: $D(Z) = Z^L$.

As an indication, it is possible, to produce the filters $H_0$ and $H_1$, to use filters known by the abbreviations "QMF" or "CQF" of "quadrature miror filter" or "Conjugate Quadrature Filter", descriptions of which can be found in the articles:

by M. J. D. Johnston under the title "Filter family design for use in quadrature mirror filter" and published in Proceeding ICAST 1980 pages 291-294;

or by M. K. J. Smith and TP Barnwell under the title "Exact reconstruction technics for tree structured sub-band coders" published in the IEEE ASSP vol. 34 No. 3 Jun. 86;

or also in the thesis by M. C. Galand under the title "Coding in sub-band, theory and application to the digital compression of the word signal". Nice 1983.

Figure 3:
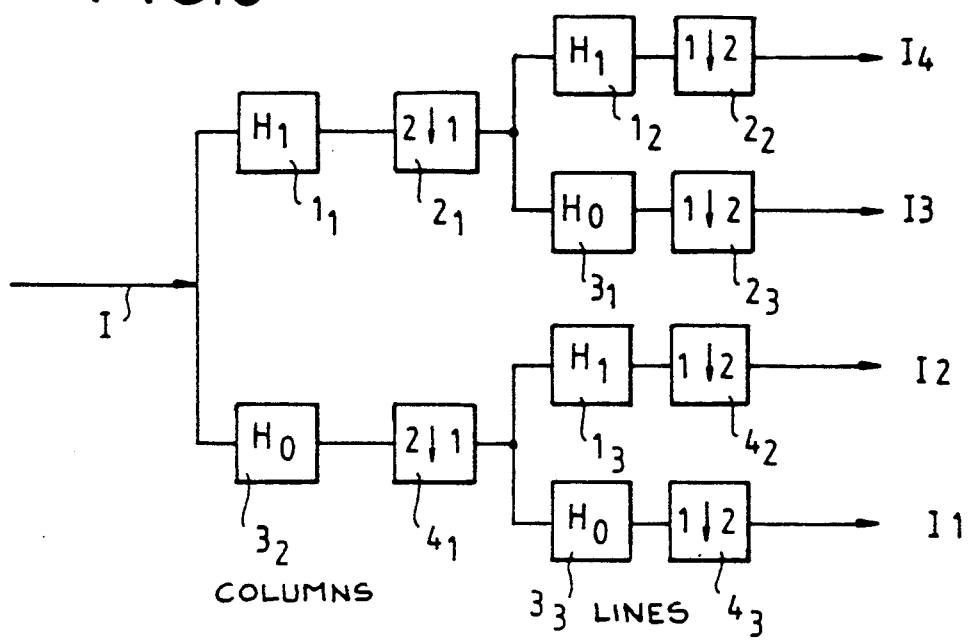
FIG. 3 is a mode of embodiment of an elementary module for decomposition of an image into sub-bands.

The arrangement of the elementary decomposition modules of the type described in FIGS. 3 and 4 has the advantage that it permits spectral divisions along very varied shapes. One hierarchical division of the spectrum is used for the movement estimator.

Figure 5:
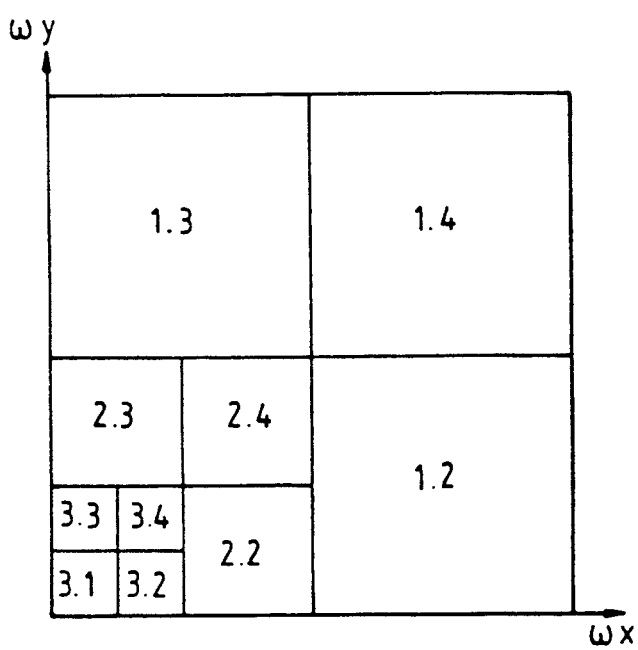
FIG. 5 is a division of the spectrum of the image following three successive iterations.
Figure 6:
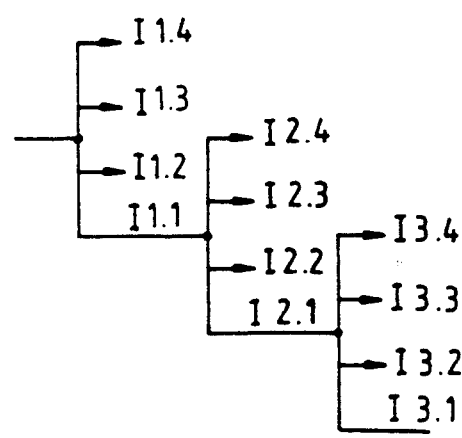
FIG. 6 is a tree for decomposition of the image obtained from a cascade of three elementary cells.

One example using three division modules is represented in FIG. 5 and the corresponding decomposition tree is shown in FIG. 6.

This decomposition directly establishes three pyramids of high-frequencies images of growing resolution.

In FIG. 5 the high-frequencies images extending in the direction of the horizontal axis of the frequencies X of the image are formed by the blocks 3.2 - 2.2 and 1.2. The high-frequencies images extending in the direction of the vertical axis of the frequencies Y are formed by the blocks 3.3 - 2.3 and 1.3 and the high-frequencies images along the directions X and Y are formed by the blocks 3.4 - 2.4 and 1.4.

Each one accentuates a given type of the details of the image in particular the vertical contours for the first, the horizontal contours for the second.

Only these first two pyramids are effectively utilized for the estimation of the movement: the first serving to bring out the horizontal movement of the vertical contours of the image, the second, the vertical movement of the horizontal contours of the image. The third pyramid is not adopted due to the fact that the nature of the images which compose it is generally too susceptible to noise.

The decomposition of FIGS. 5 and 6 also permits a pyramid of low-frequencies images to be established, composed of the blocks $I_{31}$, $I_{21}$, $I_{11}$ and I if at each stage the image $I_1$ of FIG. 2 is adopted, which came from the low-pass filtering of the lines and of the columns and of a 2-times sub-sampling.

Figure 7:
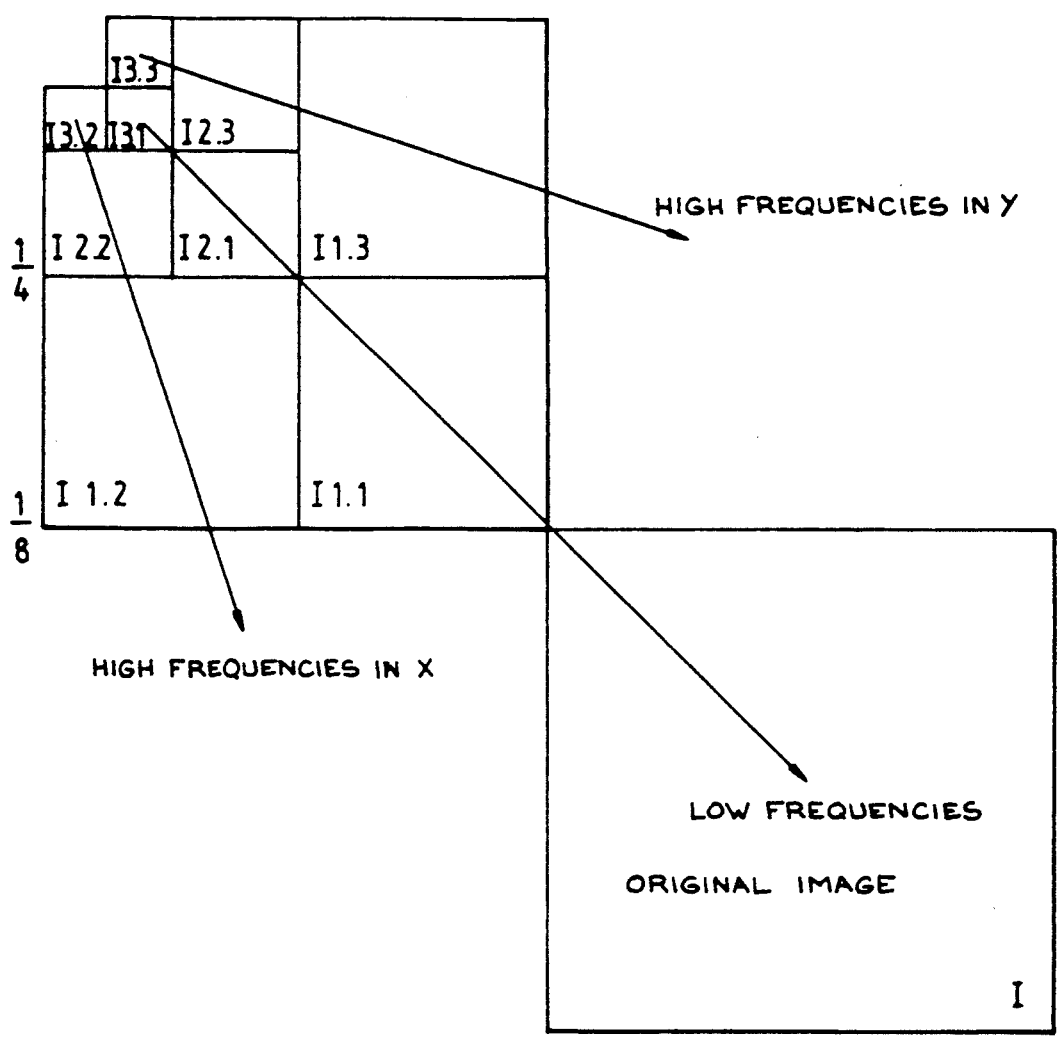
FIG. 7 is a three-pyramid structure obtained for four levels of resolution.

A corresponding three-pyramid structure for four levels of resolution is represented in FIG. 7. This structure shows that there are always at each level of resolution three images, a low-frequencies image, a high-frequencies image along the horizontal axis and a high-frequencies image along the vertical axis.

Figure 8:
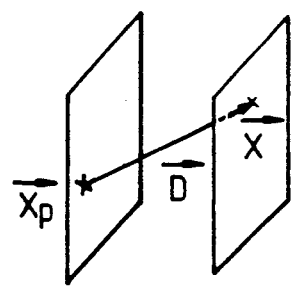
FIG. 8 is a movement vector represented between two successive images.

The determination of the field of movement takes place via a hierarchical estimation calculation on these three pyramids. It is a question as is shown in FIG. 8 for each pixel $X = (i, j)$ of a current image $I(t)$ of determining the corresponding pixel $Xp = (i' - j')$ in the preceding image $I(t-1)$. The movement vector $\vec{D}(X)$ is defined by:

$$D = (i'-i, j'-j) \text{ and is such that:}$$

$$I(t-1, Xp) = I(t, X)$$

The general principle of the movement estimator can be described as follows: 3 hierarchical estimations are carried out in parallel on 3 pyramids. The 2 estimates obtained on the high-frequencies pyramids serve only to enrich at each level of resolution the estimate obtained on the low-frequency pyramid (which constitutes the really useful information). This is done by fusion of the information obtained on the 3 pyramids at each level of resolution, the resulting estimate being attributed to the low-frequency pyramid.

Each hierarchical estimation proceeds in the following manner:

The displacement calculated, at the corresponding point on the image at the lower level of resolution serves as a prediction for the estimate at the higher level of resolution.

If $\vec{D}_2 - (j+1)$ designates the vector calculated on one image of resolution $2^{-(j+1)}$, and $\vec{D}_{2-j}$ designates the vector to be calculated on the image at the current resolution $2^{-j}$, $\vec{D}_{2-j}$ is then given by:

$$\vec{D}_2 - j = 2 \times \vec{D}_2(j+1) + d\vec{D}$$

That amounts to estimating the vector $d\vec{D}$, which represents a small variation around the prediction which is equal to twice the estimated vector at the preceding level of resolution given the under-sampling factor.

Figure 9:
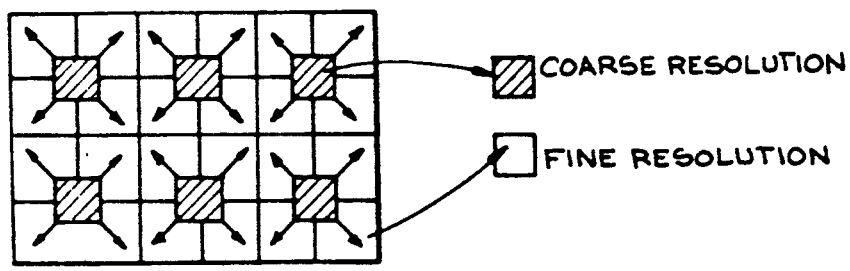
FIGS. 9 and 10 is two examples of projection of displacement vectors of an image of coarse resolution towards an image of finer resolution.

As a first approximation, as shown in FIG. 9, the movement of a point situated at the lower level can be used as a possible initialization of the movement of the 4 points at the level of resolution in question.

Nevertheless, such an approach offers only one possible initialization (or prediction) for the estimate of the movement at each point of the level in question.

Figure 10:
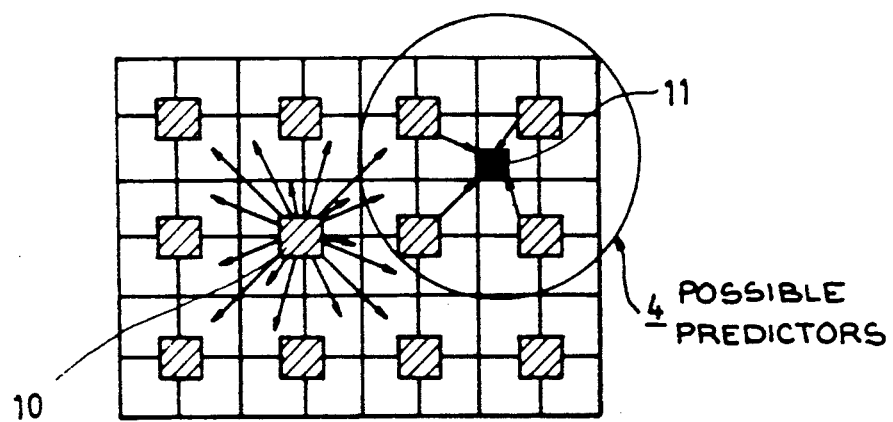

It seems more realistic to project the estimate obtained at a lower level onto 16 points surrounding it at the higher level of resolution. As FIG. 10 shows four possible predictors are then available at each point of this level instead of only one, which can only improve the estimate. For the point 10 on this figure its contribution as a predictor is carried to 16 points of the finest level of resolution and the point 11 of the fine level uses as a prediction 4 points from the coarser level. At each level of resolution a correction of ±1 pixel around the predictor is allowed.

Figure 11:
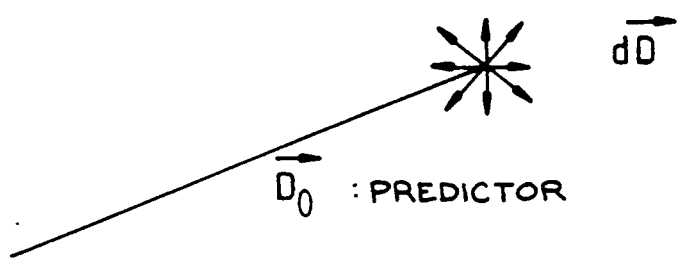
FIG. 11 is an illustration of the possible choices between proposed displacement vectors.

As FIG. 11 shows, that amounts to testing 9 possible vectors around 4 prediction vectors $\vec{D}_0$ by limiting the excursion of the vector $d\vec{D}$ to ±1 pixel in X and in Y.

This limitation in the excursion of the vector $d\vec{D}$ to ±1 pixel fixes the maximum amplitude of the movement to be estimated. Naturally in considering N levels of decomposition, to 1 pixel at the level of resolution k, corresponds $2^{k-1}$ pixels on the original image (i.e. level 1). By choosing the predictor to be nil at the coarsest level k, the maximum movement estimated at the output of the pyramid becomes:

$$\sum_{k=0}^{N-1} 2^k = ||\vec{D}_{max}||$$

This corresponds for example to a maximum amplitude of movement of 31 pixels for a decomposition to 5 levels.

At a given level of resolution, 4 possible predictors are available at each point, which each give rise, as FIG. 11 shows, to nine possible vectors. The choice of the movement vector at the point in question must therefore be made from among 36 vectors. The vector chosen is that which minimizes the offset error in a window of 3×3 pixels centered on the point in question.

Designating the current image by $I_t$,
the preceding image by $I_{t'}$
and by $\vec{D}_x=(U,V)$ the displacement vector tested by the point x of coordinates (i,j) the offset error is given by the inter-displaced-images difference DFD $(\vec{X}, \vec{D})$:

$$DFD(\vec{X}, \vec{D}) = (I_{(t-1,j+k-u(\vec{X}),j+1-V(\vec{X})} - I_{(t,i+k,j+1)})^2$$
$$k = -1, 1$$
$$l = -1, 1$$

The displacement vector D chosen is that which gives the smallest inter-displaced-image difference DFD (X,D).

However, when the estimation takes place in a uniform area of the image, and gives nil values for the inter-displaced-image differences DFD (X,D) whatever the proposed vector, the preceding criterion is no longer pertinent and there is then a risk of divergence of the algorithm.

This is resolved by carrying out a test on the difference existing between the minimum value of the set of inter-displaced-image differences DFD (X,D) and the maximum value.

If this difference is too small, the choice is always to preserve the same predictor from among the four possible predictors. Such preceding estimations take place independently on the two high-frequencies pyramids already described.

For the estimation on the low-frequencies pyramid, at each level of resolution the field of movement estimated is enriched by the fusion of the data on details coming from the high frequencies.

As the high-frequencies images are mainly at zero except on the contours of the single objects the movements estimated on these contours are useful for refining the estimated movement on the low-frequencies pyramid, and the data on the areas affected by noise of the high-frequencies images are not taken into account. This is achieved by fixing a relevance threshold on the high-frequencies images, before adopting the corresponding calculated movement.

Figure 12:
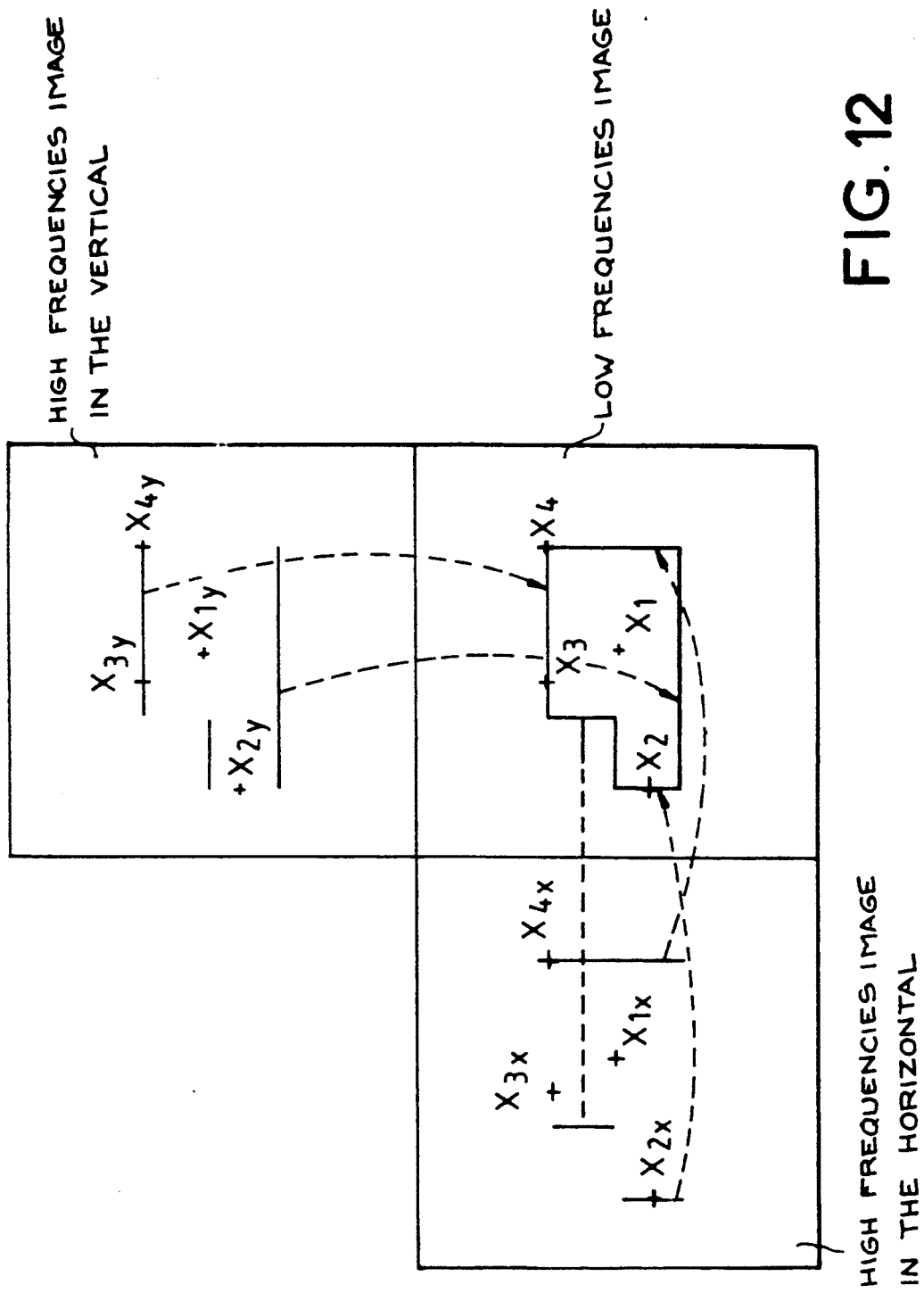
FIG. 12 is an example of fusion of estimates obtained on the high-frequency pyramids for the calculation of the estimate on the low-frequency pyramid.

This threshold is fixed as a function of the variance V of the sub-band in question. One point from a high-frequency sub-band is, in these conditions, taken into account if the absolute value of the luminance is greater than $K^V$ at this point. It should be noted that the high-frequency sub-bands have a nil mean. An example of fusion is represented at FIG. 12. On this figure to each point $X_i$ of the low-frequency image correspond points $X_{ix}$ and $X_{jy}$ on the high-frequencies images at X and at Y.

Four cases of figures are to be considered stemming from the fact that the threshold can be reached in one or more of the four bands of images.

In a first case, if the threshold is reached neither in X nor in Y, that signifies that there is no information on the high frequencies and the movement which is taken into consideration is that estimated on the low frequencies.

In a second case where the threshold is reached at $X_x$ and not in $X_y$ the choice is effected between two possible displacement vectors, one: $\vec{D}_{BF}=(U_{(x)}, V_{(x)})$ estimated on the low frequencies, the other: $\vec{D}_{HF}=(U(Xx), V_{(x)})$ whose component in X is estimated on the high frequencies.

In a third case where the threshold is reached at $X_y$ and not at $X_x$ the choice is effected between two displacement vectors, one:

$\vec{D}_{BF}=(U_{(X)}, V_{(X)})$ estimated on the low frequencies, and the other:$\vec{D}_{HF}=(U_{(X)}, V_{(Xy)})$ whose component in Y is estimated on the high frequencies.

Finally, according to a fourth case where the threshold is reached at $X_x$ and at $X_y$ the choice is effected between four vectors.

A first: $\vec{D}_{BF}=(U_{(x)}, V_{(x)})$ estimated on the low frequencies, a second: $\vec{D}_{HF1}=(U_{Xx}, V_{(x)})$ whose component in X is estimated on the high frequencies, a third: $\vec{D}_{HF2}=(U_{(x)}, V_{Xy})$ whose component in Y is estimated on the high frequencies, and a fourth: $\vec{D}_{HF3}=(U_{(Xx)}, V_{(Xy)})$ whose component is estimated on the high frequencies at X and at Y.

In every case the vector chosen is that which minimizes the offset error on the low-frequencies image.

Thus, the estimation on the low-frequencies pyramid takes into account at each level the estimates on the images of details at the same level. This amalgamated field is next used as shown in FIG. 13 as a predictor for the estimate at the following level.

Figure 13:
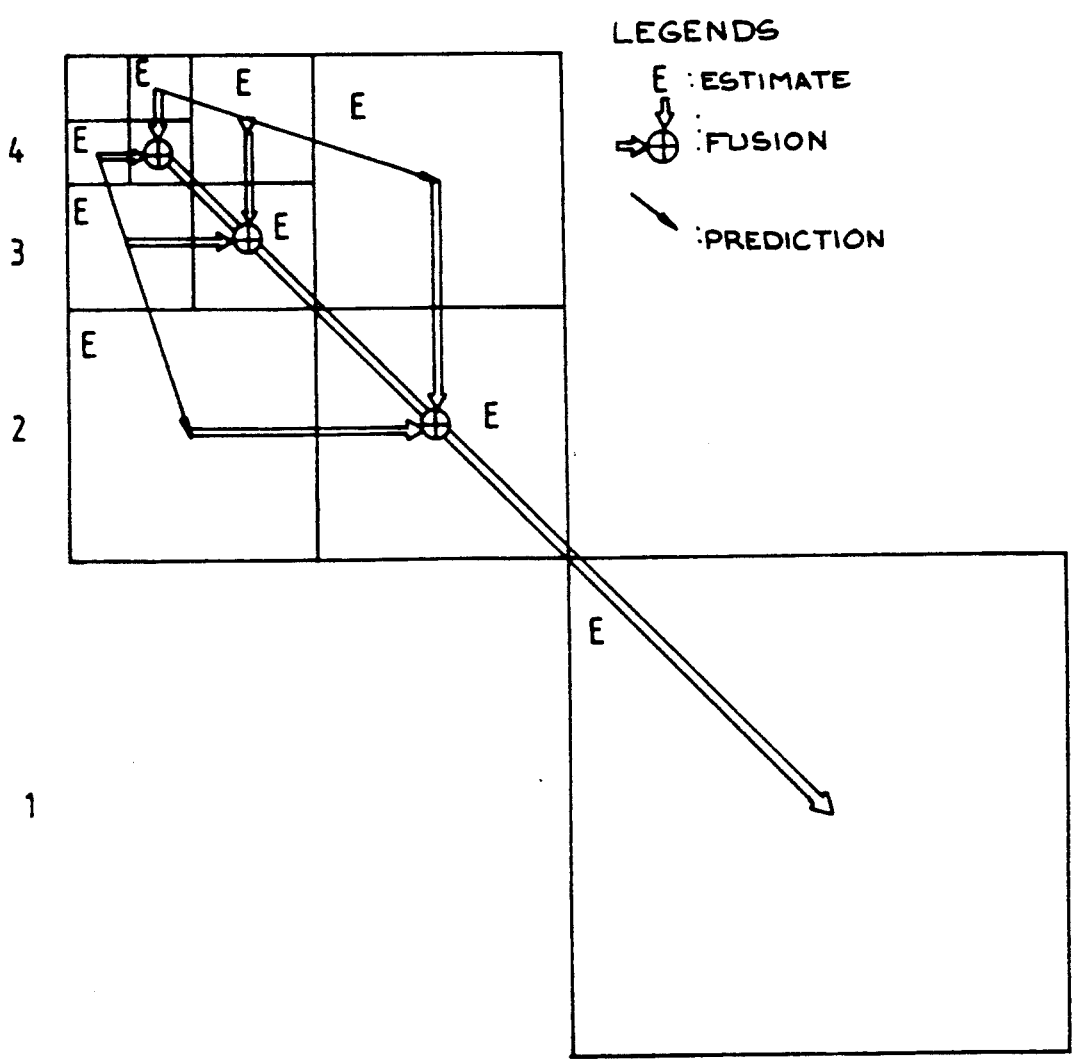
FIG. 13 is an illustration of the processing algorithm employed by the method according to the invention.

Thus, at each level of resolution 2, 3 and 4 represented in FIG. 13 an estimation in each sub-band is effected with, as prediction, the estimate in the same sub-band or preceding level and an amalgamation of the three estimates carried out in the low-frequencies sub-band is effected.

The estimation at level 1 is effected in the original image for prediction of the fusion estimates at level 2.

Figure 14:
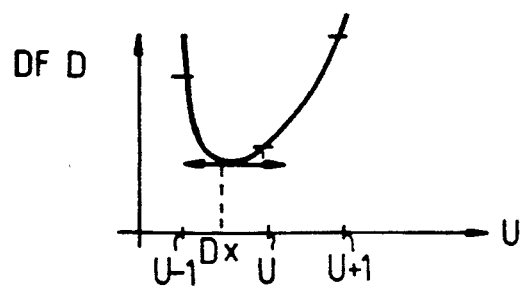
FIG. 14 is an interpolation curve permitting the fields of movement to be estimated with a precision less than one pixel.

Naturally the precision of the estimate to 1 pixel emanating from the last level of resolution of the field of movement can still be improved by interpolating, for example, the source image with 2 or 4 etc. or more points in X and in Y in order to obtain precisions of estimates of $\frac{1}{2}$, $\frac{1}{4}$ etc $\frac{1}{2}^K$ pixels. However, as this solution can rapidly become very costly, it is preferable to use a method of rapid interpolation consistent with seeking the minimum of each inter- displaced-image difference DFD as a function of one of the two variables U and V, the other remaining constant as is represented in FIG. 14 where the DFD curve is drawn with V constant.

The line is drawn for three values of U (U-1, U and U+1). The parabola thus obtained presents a corresponding minimum abscissa $D_x$ which is the component in X of the displacement. The same operation can be effected in the Y direction of the image to obtain a displacement vector D real=($D_x$, $D_y$) with a precision less than one pixel.

This method is in effect very rapid as the criterion DFD (U,V) is calculated for the 9 neighbouring vectors of the vector chosen during the choice. In the worst case, where the vector chosen is on one of the corners of the square of pixels represented, there are only two values for DFD (D) to be calculated in order to effect the interpretation by the parabola. On the other hand there is no value to calculate if it is at the center and a single value to calculate for the other points.

We claim:

1. A method for hierarchical estimation of movement in a sequence of images by performing a hierarchical decomposition of each image in said sequence of images for a plurality of resolution levels, comprising the steps of:
   estimating an overall movement at a most coarse resolution level;
   constructing a pyramid of low-frequency images and at least one pyramid of high-frequency images in a direction parallel to the horizontal or vertical borders of each of said images; and
   refining, for each resolution level, said overall movement as the resolution level increases.

2. The method according to claim 1, wherein said hierarchical decomposition is performed by hierarchically decomposing said images into sub-bands of said images and retaining, at each resolution level of the hierarchical decomposition, the sub-bands which represent the vertical and horizontal contours of said images.

3. The method according to claim 2, further comprising the step of estimating the movement of each of a plurality of points of a current image by correlating an NxN block of points centered around a current point, with corresponding points in an immediately preceding image, wherein the investigation of the displacement at the current level of resolution is effected around the displacement calculated at the preceding level of resolution.

4. The method according to claim 3, wherein said point-to-point estimation of the movement is performed in a hierarchical manner on each of said pyramids.

5. The method according to one of claims 3 and 4, wherein for each estimation, four prediction vectors are used, and wherein the prediction vector which provides the smallest interdisplaced image difference is selected as the displacement vector.

6. The method according to claim 5, wherein the four prediction vectors of a lower resolution level are used and the displacement vector which provides the smallest interdisplaced image difference is investigated in the vicinity of each of the four prediction vectors, in order to begin an estimation at a defined level of resolution.

7. The method according to one of claims 1-4, further comprising the steps of performing the movement estimate independently for each high-frequency image pyramid and enriching for each resolution level using the movement data obtained on the high-frequencies of the image.

8. The method according to claim 5, wherein the same prediction vector is preserved in the uniform areas of the image.

9. The method according to claim 5, wherein a parabolic estimate of the displacement vector is generated in order to obtain a precision greater than plus or minus one pixel.

* * * * *